United States Patent [19]
Shinohara

[11] Patent Number: 5,905,993
[45] Date of Patent: May 18, 1999

[54] FLASH MEMORY CARD WITH BLOCK MEMORY ADDRESS ARRANGEMENT

[75] Inventor: Takayuki Shinohara, Tokyo, Japan

[73] Assignee: Mitsubishi Denki Kabushiki Kaisha, Tokyo, Japan

[21] Appl. No.: 08/827,861

[22] Filed: Apr. 9, 1997

Related U.S. Application Data

[63] Continuation of application No. 08/554,716, Nov. 7, 1995, abandoned.

[30]  Foreign Application Priority Data

Nov. 9, 1994 [JP] Japan .................................. 6-274943

[51] Int. Cl.$^6$ .................................................. G11C 13/00
[52] U.S. Cl. ............................. 711/103; 711/4; 711/102; 711/171; 711/202; 711/206
[58] Field of Search ...................... 395/500, 310; 365/218; 711/4, 112, 171, 102, 103, 202, 206

[56]  References Cited

U.S. PATENT DOCUMENTS

| | | | |
|---|---|---|---|
| 4,858,034 | 8/1989 | Hassel et al. ............................ | 360/51 |
| 5,018,095 | 5/1991 | Nissimov ................................ | 395/404 |
| 5,457,658 | 10/1995 | Niijima et al. .......................... | 395/416 |
| 5,459,850 | 10/1995 | Clay et al. ......................... | 395/497.02 |
| 5,465,338 | 11/1995 | Clay ....................................... | 395/310 |
| 5,473,765 | 12/1995 | Gibbons et al. ....................... | 395/500 |

*Primary Examiner*—Eddie P. Chan
*Assistant Examiner*—Than V. Nguyen
*Attorney, Agent, or Firm*—Leydig, Voit & Mayer

[57]  ABSTRACT

A flash disk card using a flash memory is provided with MPU for converting the cylinder, head and sector numbers, which are input from a host device, into a logical block address (LBA) and a sector address in block format, determining a physical block address (PBA) having the same size as that of an erase block from the logical block address with reference to a logical/physical block address conversion table stored in the flash memory, and accessing the flash memory on the basis of the physical block address. The flash disk card permits a decrease in size of the address conversion table, can be constructed at low cost, and has no need for constructing the table at each time a power supply is turned on.

19 Claims, 12 Drawing Sheets

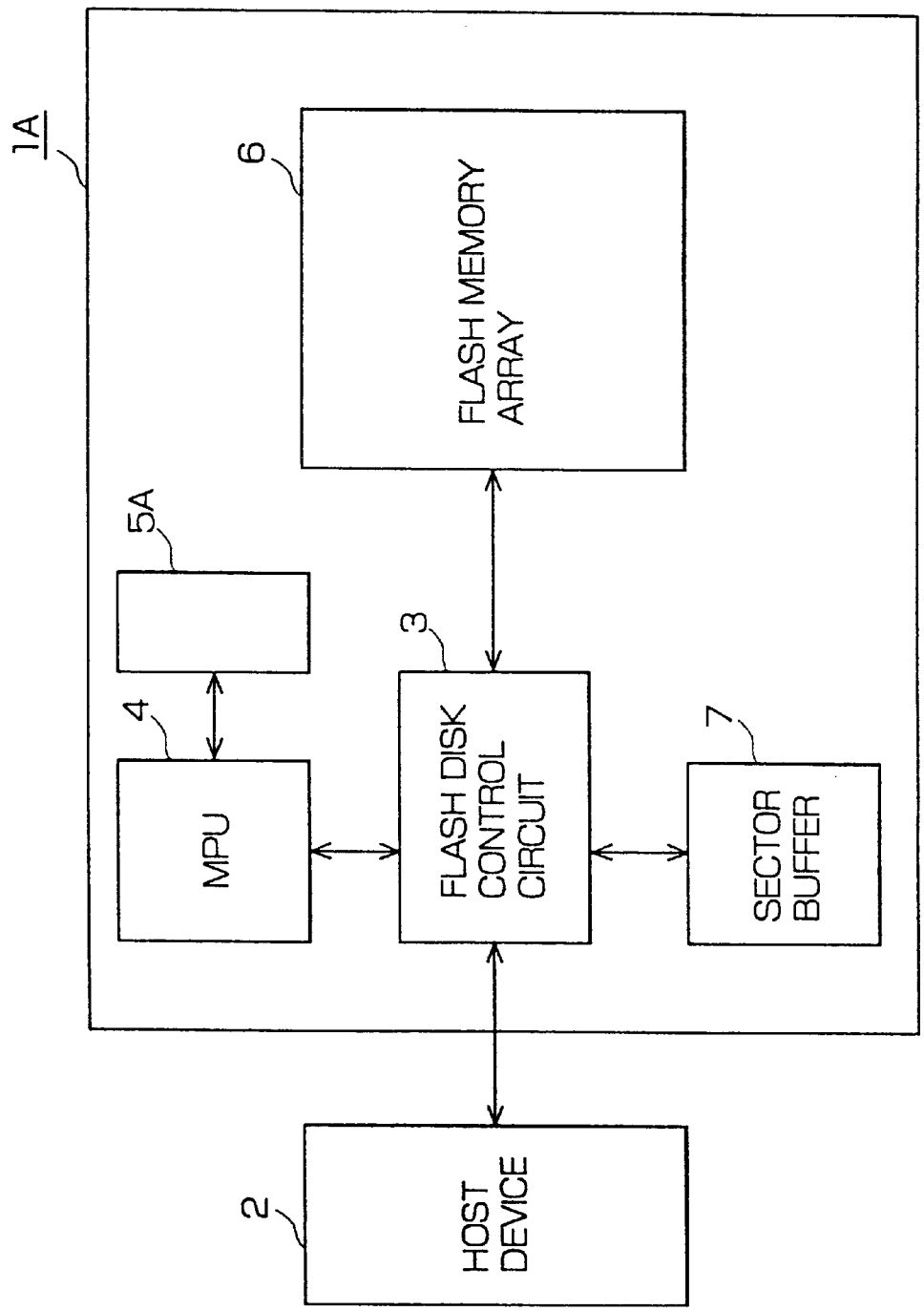

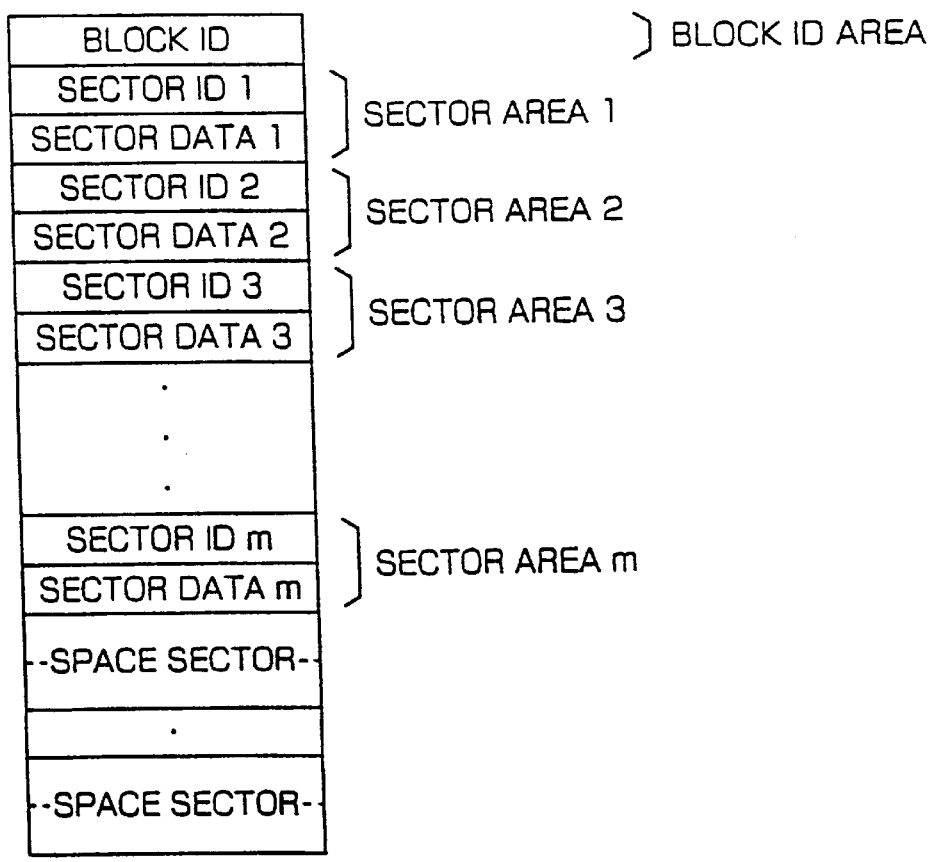

FIG. 8

| LBA | PBA |
|---|---|
| 0 | 0 |
| . | . |
| . | . |
| 3 | 3 |
| . | . |
| . | . |
| . | . |
| 7 | 7 |

↓

| LBA | PBA |
|---|---|
| 0 | 0 |
| . | . |
| . | . |
| 3 | 8 |
| . | . |
| . | . |
| . | . |
| 7 | 7 |

| LSA | PSA |
|---|---|
| 1 | 1 |
| 2 | 2 |
| . | . |
| . | . |
| . | . |
| n | n |
| . | . |
| . | . |
| . | . |
| . | . |
| X | X |

~5

FLASH MEMORY CARD WITH BLOCK MEMORY ADDRESS ARRANGEMENT

This disclosure is a continuation of patent application Ser. no. 08/554,716, filed Nov. 7, 1995, now abandoned.

BACKGROUND OF THE INVENTION

1. Field of the Invention

The present invention relates to a flash disk card equipped with a flash memory for use as an external storage medium for an information processing device.

2. Description of the Related Art

A known flash disk card will be described below with reference to FIGS. 10 to 14. FIG. 10 is a drawing illustrating the configuration of the known flash disk card. FIG. 11 is a drawing illustrating the configuration of an address conversion table of the known flash disk card. FIG. 12 is a drawing illustrating an addressing system of the known flash disk card. FIG. 13 is a drawing illustrating the configuration of a flash memory of the known flash disk card. FIG. 14 is a drawing illustrating a change in content of the address conversion table of the known flash disk card.

In FIG. 10, a known flash disk card 1 comprises a flash disk control circuit 3 having a plurality of registers for receiving and transmitting cylinder, head and sector numbers or commands from the host device 2 such as a computer or the like, a MPU 4 for controlling the flash disk card, a logical/physical sector address conversion table 5 comprising a 1 Mbit SRAM, a flash memory array 6, for example, having 20 Mbytes, and a sector buffer 7 comprising a RAM.

As shown in FIG. 11, the logical/physical sector address conversion table 5 converts logical sector addresses (LSA) into physical sector addresses (PSA) of the flash memory array 6.

The flash memory array 6, which is an electrically rewritable nonvolatile memory, requires an erasing operation requiring more time than reading and writing operations during data rewriting. The flash memory array 6 erases data in blocks of several kilo-bytes to several tens kilobytes or chips. This unit is greater than the sector size (512 bytes) which is the unit of data transfer of a hard disk device.

Thus, the flash disk card 1, which emulates a hard disk device, i.e., performs a pseudo-operation, by using the flash memory array 6 generally employs the method of displaying only a flag indicating that the old sector is invalid without erasing the data of the old sector in response to a command to update data in units of sectors. The command is output from the host device 2, and writing updates data in a space area of the flash memory array 6.

In this method, since the correspondence between the sector-unit address (logical sector address: LSA) specified by the host device 2 and the address (physical sector address: PSA) of the flash memory 6 where update data is actually written changes each time data is updated, the logical/physical sector address conversion table 5 shown in FIG. 11 is used.

Like access to the hard disk device, the flash disk card 1 is accessed from the host device 2 by specifying a cylinder number, a head number and a sector number in four registers of the flash disk control circuit 3, as shown in FIG. 12. Two registers are used for higher and lower cylinder numbers. The cylinder number, head number and sector number are then converted into a logical sector address. This address conversion is performed on the basis of the following equation (1):

$$LSA = (C \times HpC + H) \times SpH + S - 1 \qquad (1)$$

wherein C is the cylinder number, HpC is the number of heads per cylinder, H is the head number, SpH is the number of sectors per head, and S is the sector number.

The MPU 4 converts the logical sector address (LSA) into the physical sector address (PSA) with reference to the logical/physical sector address conversion table 5. The physical sector address is used for operations of reading and writing data.

Description will now be made of update of a content, for example, the content of logical sector address L2, of the flash memory 6. As shown in FIG. 13, the flash memory 6 has a data area having physical sector addresses of P0, P1, P2 to PX, and a space area having physical sector addresses from PY. In the flash memory 6, the logical sector addresses L0 to L2 are presently used (data is actually stored).

The MPU 4 first reads the content of the present logical sector address L2 (physical sector address P2), confirms that the read data is effective, and then sets an invalid sector flag (mark Δ). The MPU 4 then checks the content of physical sector address PY of the space area, confirms that the sector is a spare sector, and then writes update data therein.

The content of the physical sector address corresponding to logical sector address L2 of the logical/physical sector address conversion table 5 is converted from 2 to Y, as shown in FIG. 14.

In this way, since the correspondence between the sector-unit address (LSA) specified by the host device 2 and the physical sector address (PSA) of the flash memory 6 where update data is actually written changes each time data is updated, the logical/physical sector address conversion table 5 is used. In a simple writing operation, the MPU 4 adds the logical/physical sector address conversion table 5 for causing the logical sector address to correspond to the physical sector address.

Although SRAM is used for the logical/physical sector address conversion table 5 because of the rewriting frequency and high speed, the conversion table 5 is formed in units of sectors (512 bytes), thereby causing the problem that the size of the SRAM for the conversion table increases as the card capacity increases.

In an example where the flash disk card 1 has 20 Mbytes, the number of sectors is 40 k, and 16 digits (2 bytes) are required for binary representation display of the 40 k sectors. The size of the SRAM for the conversion table is thus 80 kbytes, and SRAM with 1 Mbits (128 bytes) is finally required.

The above known flash disk card 1 comprises the logical/physical sector address conversion table 5 which is formed in units of sectors, and thus has the problem that the size of the conversion table increases as the capacity of the card increases.

Although the SRAM is used for storing the large conversion table, the SRAM is volatile and thus has the problem that the table must be reconstructed each time a power supply is turned on.

SUMMARY OF THE INVENTION

The present invention has been achieved for solving the above problems, and an object of the invention is to provide a flash disk card which permits a decrease in size of an address conversion table, a decrease in rewriting frequency of the address conversion table, and an increase in life of the card by uniforming the numbers of times of erasing in respective erase blocks of a flash memory.

In accordance with one aspect of the present invention, a flash disk card comprises an electrically rewritable nonvolatile flash memory for storing data, and access means for converting the cylinder number, head number and sector number, which are input from the outside, into a logical block address and a sector address in block, converting the logical block address into a physical block address with reference to a logical/physical block address conversion table, and accessing the flash memory on the basis of the physical block address and the sector address.

It is thus possible to decrease the size of the address conversion table and the rewriting frequency of contents in the address conversion table.

In a flash disk card in accordance with an other aspect of the present invention, the logical/physical block address conversion table is stored in the flash memory. The flash disk card can thus be formed at low cost, and has no need to construct the table each time a power supply is turned on.

In a flash disk card in accordance with a further aspect of the present invention, information with respect to an erasing characteristic is stored in each physical block of the flash memory. It is thus possible to provide uniformity in deterioration in erase blocks, thereby increasing the life and realizing high reliability.

BRIEF DESCRIPTION OF THE DRAWINGS

FIG. 1 is a block diagram illustrating the configuration of a first embodiment of the present invention;

FIG. 2 is a drawing illustrating a logical/physical block address conversion table in the first embodiment of the present invention;

FIG. 3 is a drawing illustrating a configuration of logical and physical blocks in the first embodiment of the present invention;

FIG. 8 is a drawing illustrating a change in content of a logical/physical block address conversion table in the first embodiment of the present invention;

DESCRIPTION OF THE PREFERRED EMBODIMENTS

First Embodiment

Figure 4:
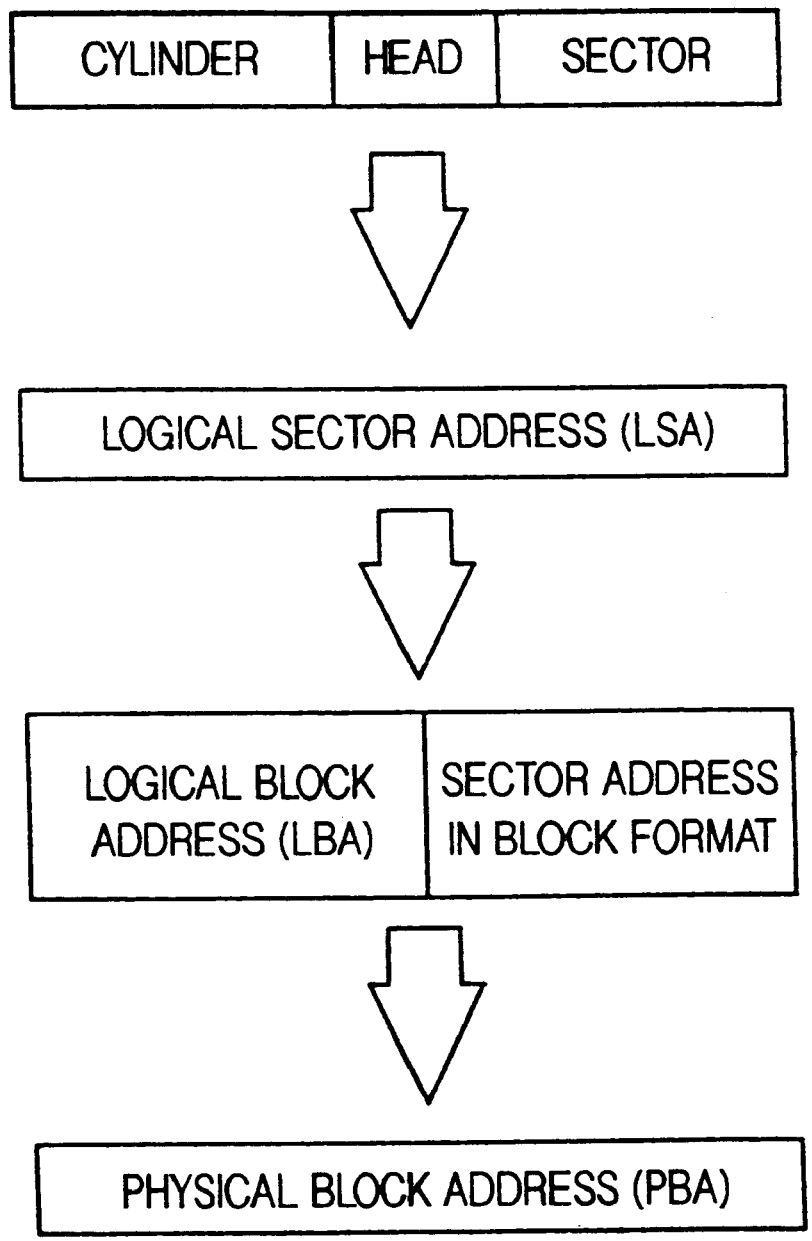
FIG. 4 is a drawing illustrating an addressing system in the first embodiment of the present invention.
Figure 5:
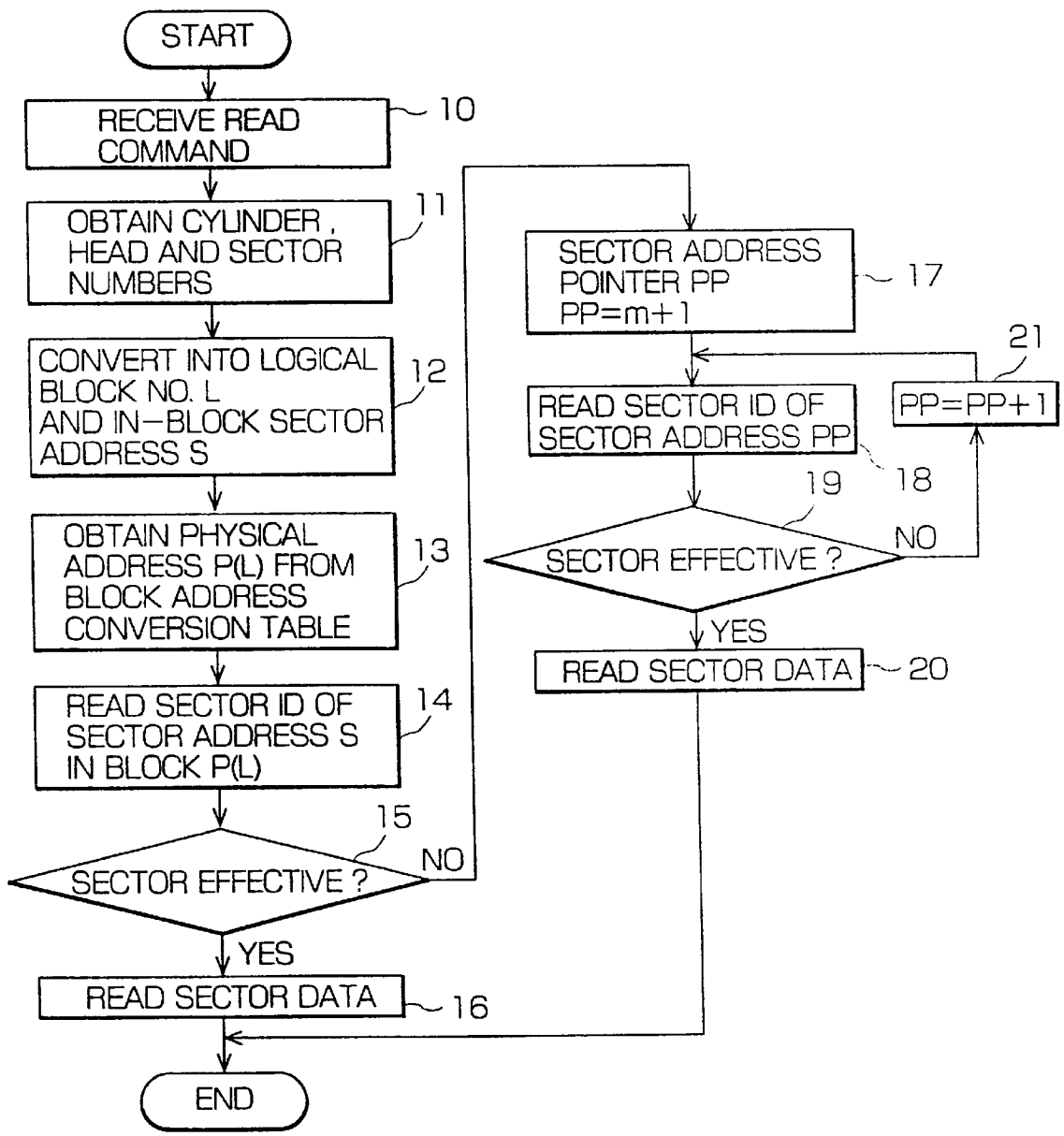
FIG. 5 is a flowchart illustrating a reading operation in the first embodiment of the present invention.
Figure 6:
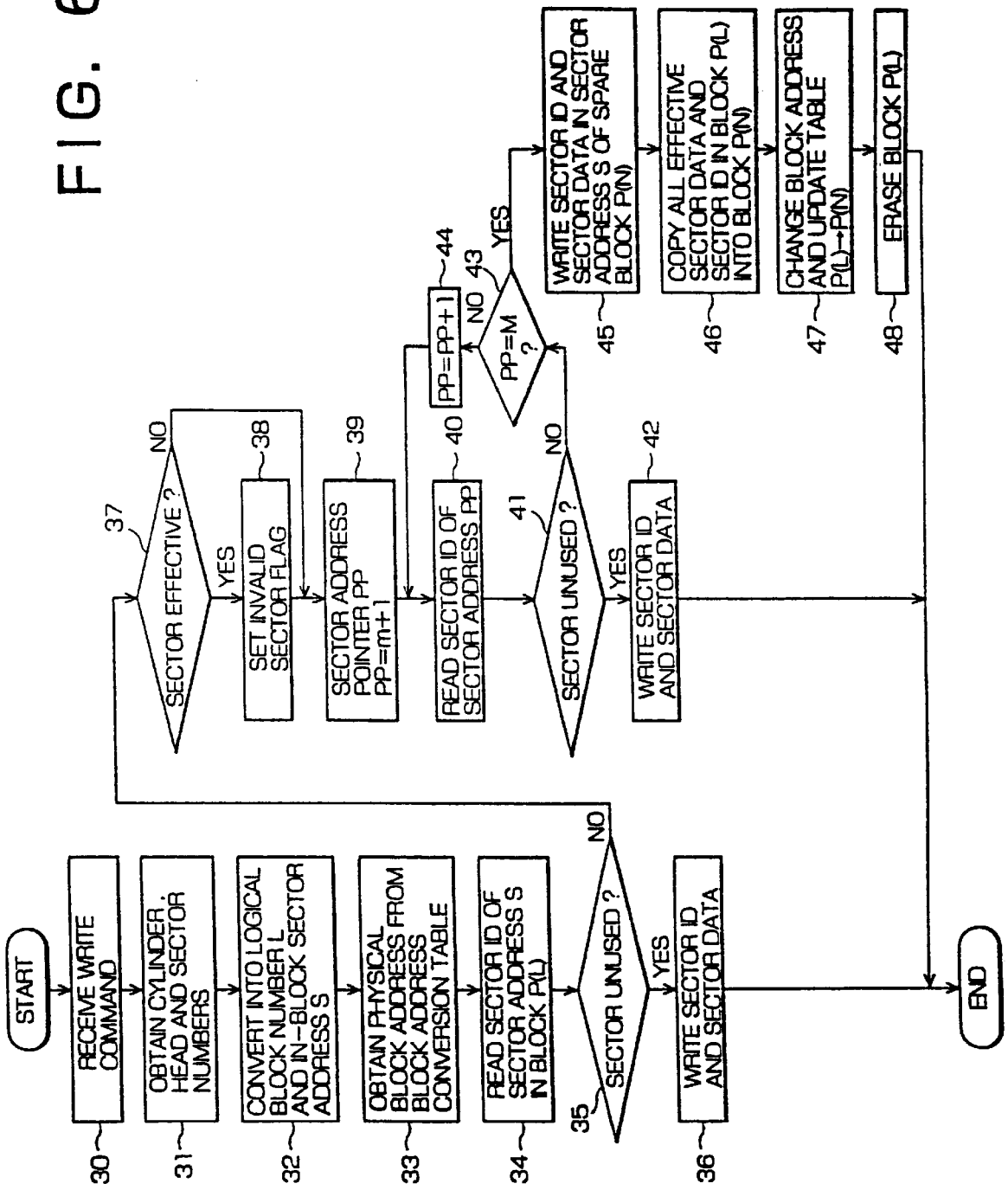
FIG. 6 is a flowchart illustrating a writing operation in the first embodiment of the present invention.
Figure 7:
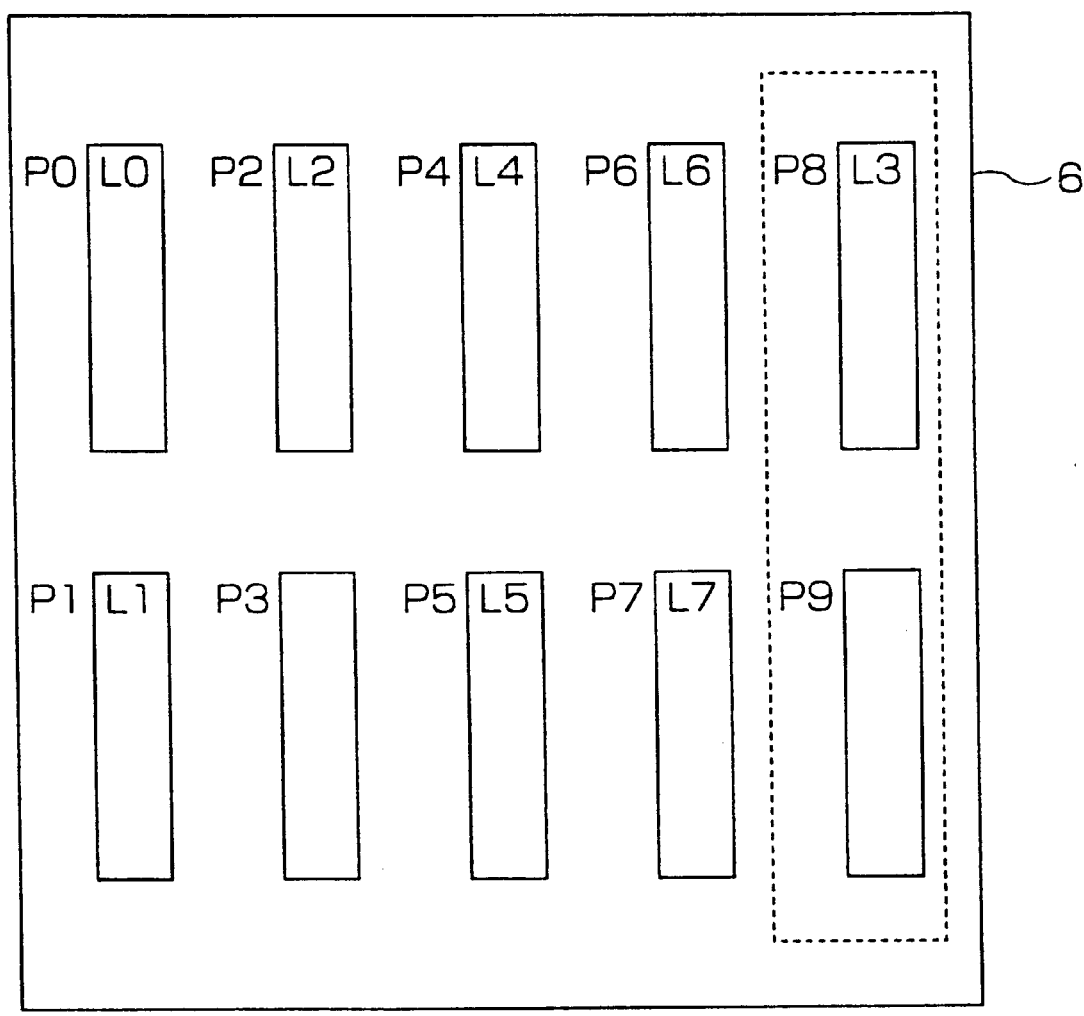
FIG. 7 is a drawing illustrating the configuration of a flash memory in the first embodiment of the present invention.
Figure 8:
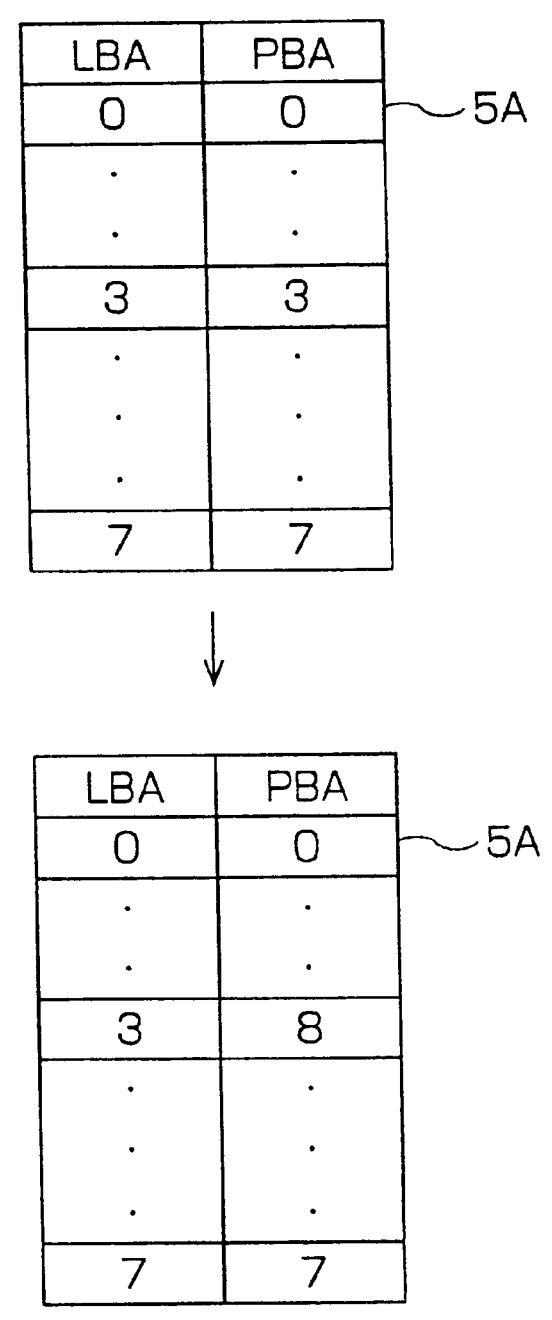

An embodiment of the present invention is described with reference to FIGS. 1 to 8. FIG. 1 is a block diagram illustrating the entire configuration of a first embodiment of the present invention. FIG. 2 is a drawing illustrating the configuration of a logical/physical block address conversion table of the first embodiment. FIG. 3 is a drawing illustrating the configuration of a physical block of the first embodiment. FIG. 4 is a drawing illustrating an addressing system of the first embodiment. FIGS. 5 and 6 are flowcharts respectively illustrating reading and writing operations. FIG. 7 is a drawing illustrating the configuration of a flash memory of the first embodiment. FIG. 8 is a drawing illustrating a change in content of the logical/physical block address conversion table of the first embodiment. In these drawings, the same reference numerals denote the same or equivalent portions.

In FIG. 1, flash disk card 1A comprises a flash disk control circuit 3, an in-card microprocessor unit (MPU) 4, a logical/physical block address conversion table 5A which is referred to by the MPU 4 during reading and writing operations, a flash memory array 6, and a sector buffer 7 comprising RAM. The logical/physical block address conversion table 5A is stored in a portion of the flash memory array 6. The logical/physical block address conversion table 5A may be stored in another flash memory. Reference numeral 2 denotes a host device for accessing the flash disk card 1A as an external storage medium.

The logical/physical block address conversion table 5A shown in FIG. 2 is adapted for converting logical block addresses (LBA) to physical block addresses (PBA) of the flash memory 6. Logical and physical blocks have the same size as that of an erase block.

In FIG. 3, a physical block comprises a block ID and a sector including a predetermined number of sector areas, each of the sector areas comprising a sector ID and sector data. FIG. 3 shows the state where sector addresses of 1 to m are used. At the top of the physical block, the block ID area is provided for storing a logical block number (logical block address) corresponding to this physical block, block status information indicating the state of the physical block used, and data including the number of times the physical block has been erased. Sector data and sector area ID of each sector are stored together after the block ID area. The sector ID includes information such as a sector area number (sector address) which indicates the position of the sector area in the physical block, an invalid sector flag indicating whether data of the sector area is effective or invalid, and a sector use flag indicating various conditions including whether or not the sector area is used, etc.

Like in access accessing a hard disk device (not shown), in access to the flash disk card 1A from the host device 2, as shown in FIG. 4, the cylinder number, head number and sector number are specified for the operation of reading data from or writing data into a sector having a 512-byte size, which is the unit of data transfer.

In the flash disk card 1A in accordance with the first embodiment, the cylinder, head and sector addresses specified by the host device 2 are converted into a logical sector address (LSA) on the basis of equation (1), as in the known disk card.

The address is then converted on the basis of equation (2) below so as to specify a logical block address (LBA) of a block having the same size as that of the erase block of the flash memory 6 in the card, and a sector address (SA) in the logical block. In equation (2), LBA corresponds to the quotient, and SA corresponds to the residue. If the size of the erase block (logical block) is 64 kbytes, the possible number of sectors per block is 100 (50 kbytes) in view of block ID, sector ID, spare sectors, etc.

$$LBA = LSA \div (\text{number of sectors per block}) \quad (2)$$

In accessing the flash memory 6 in the card, the MPU 4 determines the physical block address (PBA) with reference to the logical/physical block address conversion table 5A shown in FIG. 2, and the reading or writing operation is performed on a sector in the physical block by using the sector address (SA) in the logical block (Steps 10 to 14, Steps 30 to 34).

As described above, in the flash disk card 1A in accordance with the first embodiment, since the logical/physical block address conversion table 5A is used, and the flash memory 6 is controlled for every erase block, the size of the address conversion table can be decreased. For example, for the 20 Mbyte flash memory 6, if the size of the erase block (logical block) is 64 kbytes, the number of logical blocks is 320, and a sufficient size of the address conversion table 5A is 1 kbytes even if each block is represented by 2 bytes. Since the known address conversion table 5 requires 128 kbytes (1 Mbits), the size of the conversion table 5A in this embodiment is 1/128 of the known conversion table.

In the reading operation, if the invalid sector flag of a sector ID is reset, the MPU 4 decides that the sector is effective, and then reads sector data (Steps 15 and 16). On the other hand, if the invalid sector flag is set, the MPU 4 decides that the sector is invalid and sets sector address pointer PP to sector (m+1) next sector after sector m. Spare sectors at the beginning are successively retrieved in searching for an effective sector and reading sector data thereof (Steps 17 to 21). In FIG. 3, reference character m denotes the last logical sector number in the block. In FIG. 3, attention must be given to the point that each sector area comprises a sector ID and sector data, i.e., two stages.

In the writing operation, if the sector use flag of a sector ID is reset, the MPU 4 decides that the sector area is not used, i.e., is available, and stores sector ID and sector data (Steps 35 and 36) in the sector area. On the other hand, if the sector use flag is set, the MPU 4 decides that the sector area is used, and performs an update operation as described below.

An example where the content of sector 2 is updated is described below. The MPU 4 reads the content of present sector ID 2, confirms that data is effective, and then sets the invalid sector flag. The MPU 4 then checks the content of an address next to the last sector area m in this block, confirms that the sector area is a spare sector area, and then writes new sector ID 2 and data of sector 2 (Steps 39 to 42). When the sector of the address next to the last sector area m is not a spare sector area, the sector address pointer is updated, and the same processing as described above is repeated (Step 44).

As described above, in the first embodiment, a spare sector area is provided in each of the physical blocks so that when data of a sector area in the physical block is updated, the data is written in the spare sector area in the same physical block, thereby eliminating the need to update the logical/physical block address conversion table 5A each time content of a sector area is updated. Flash memory is cheaper than SRAM and is nonvolatile, it requires no reconstruction of the table each time the power supply is turned on, and can be used as a memory for storing the address conversion table 5A.

The operation when update of sector data in the same physical block leaves no spare sector area will be described below.

In this case, m effective sector area in the physical block are transferred to another spare block in the initial (erased) state. The content of the physical block address corresponding to the respective logical block address in the logical/physical block address conversion table 5A is changed to the physical block address of this spare block. After sector data is completely transferred to the spare block, data on the number of times the block was erased that was written in the block ID of the old physical block is saved, and then the old block is erased. When the number of times of erasing is incremented by 1 and written in the block ID area, the old physical block becomes a new spare block.

Namely, when the sector address pointer PP is equal to m (the last physical sector number in the block) (Step 43), the MPU 4 decides that there is no spare sector area in the physical block. For example, as shown in FIG. 7, if there is no spare sector area at physical block address 3, m effective sector area in the physical block are transferred to a spare block at physical block address 8 in the initial (erased) state. Namely, the sector ID and sector data which are the present update data are written at the corresponding sector address in the spare block, and all effective sector area at physical block address 3 are then copied into the corresponding sector addresses in physical block 8 (Steps 45 and 46).

At this time, the content of the physical block address corresponding to the logical block address 3 in the logical/physical block address conversion table 5A is changed to the physical block address 8 of the spare block (Step 47). After sector data is completely transferred to the spare block, data on the number of times the block was erased that was written in block ID of the old physical block 3 is saved, and the old physical block 3 is then erased. When the number of times of erasing is incremented by one and written in the block ID area, the old physical block 3 becomes a new spare block (Step 48).

When there occurs a need to newly transfer data to the spare block, the numbers of times of erasing in the block ID areas of respective spare blocks are checked, and controlled so that the degrees of deterioration of the respective blocks become uniform, thereby permitting an increase in the number of times of rewriting (life) as a card, and the realization of a card with high reliability.

Second Embodiment

Figure 9:
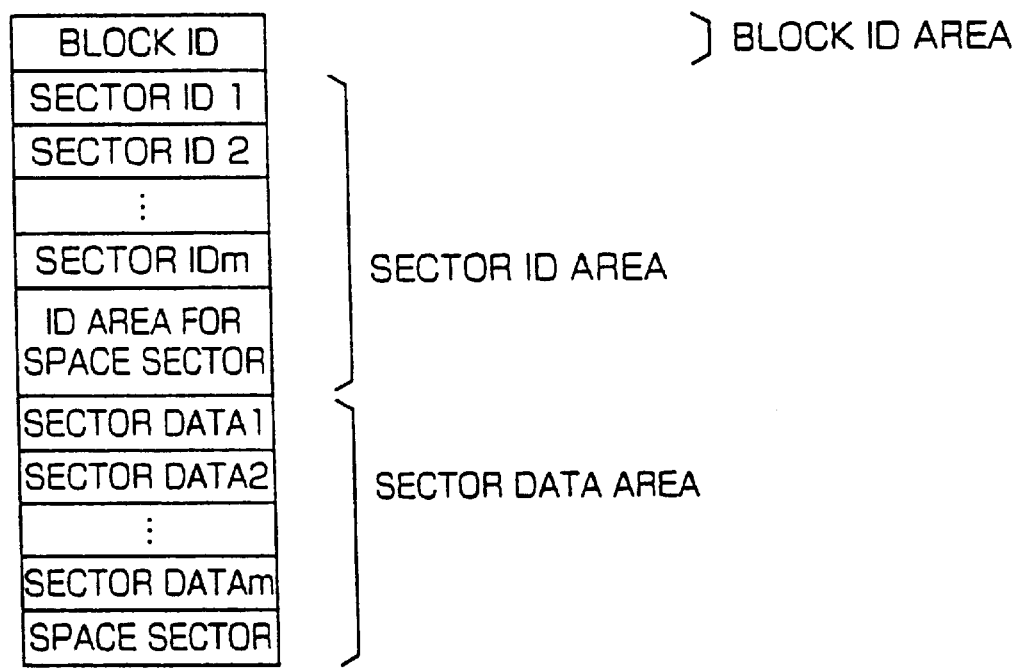
FIG. 9 is a drawing illustrating a configuration of logical and physical blocks in a second embodiment of the present invention.
Figure 10:
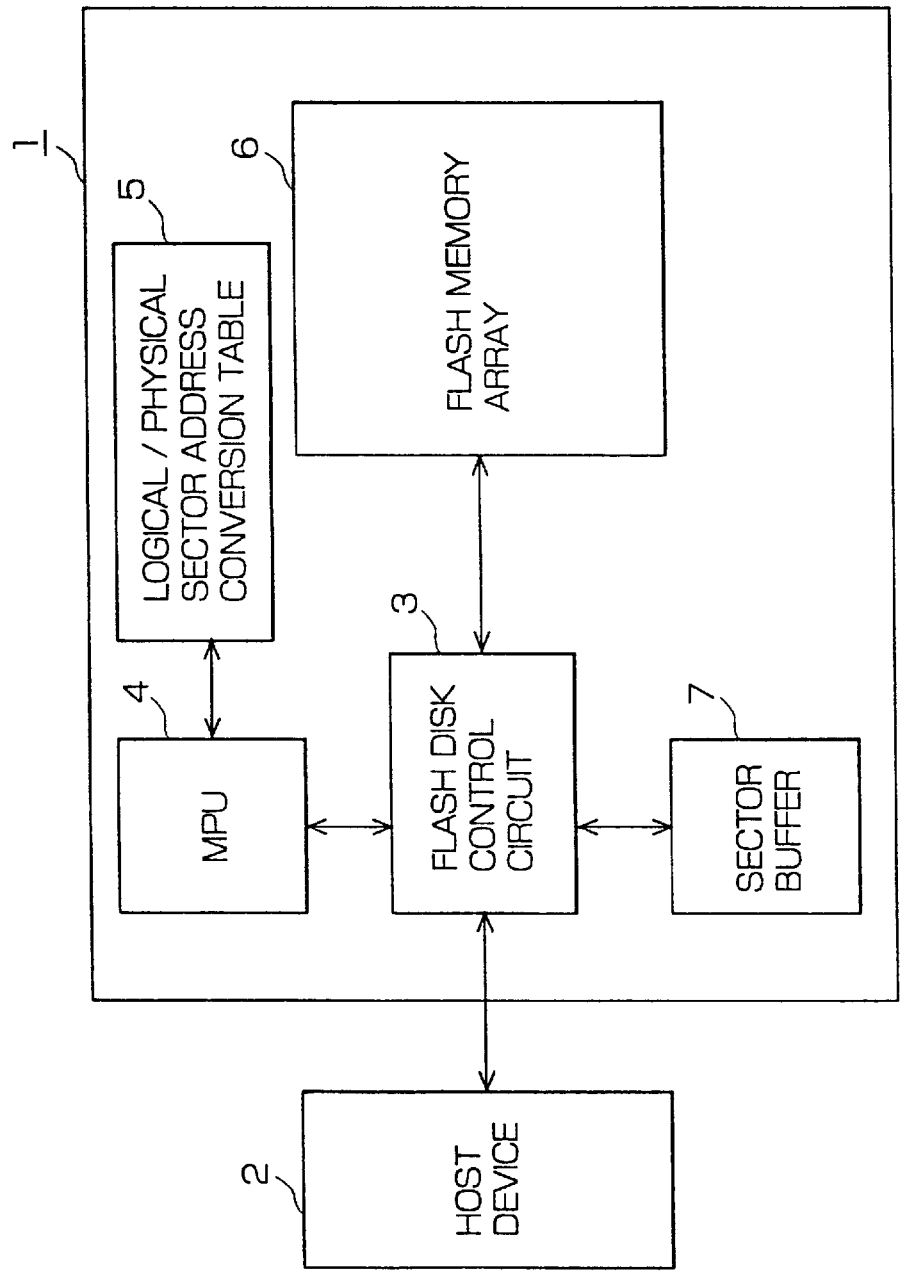
FIG. 10 is a drawing illustrating the configuration of a privately known but unpublished flash disk card.
Figures 11, 12:
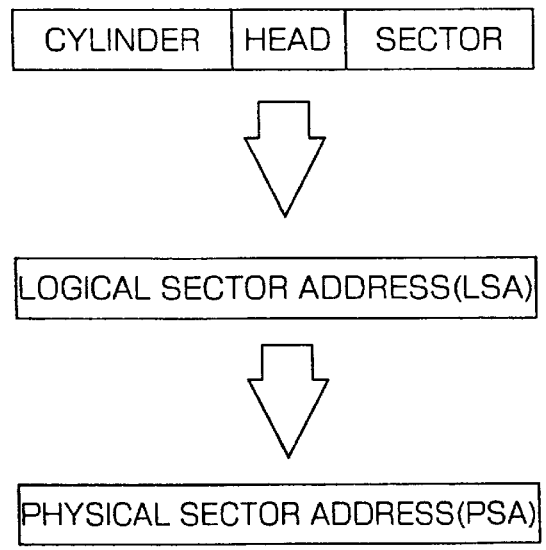
FIG. 11 is a drawing illustrating a logical/physical sector address conversion table of the privately known but unpublished flash disk card.
FIG. 12 is a drawing illustrating an addressing system of the privately known but unpublished flash disk card.
Figure 13:
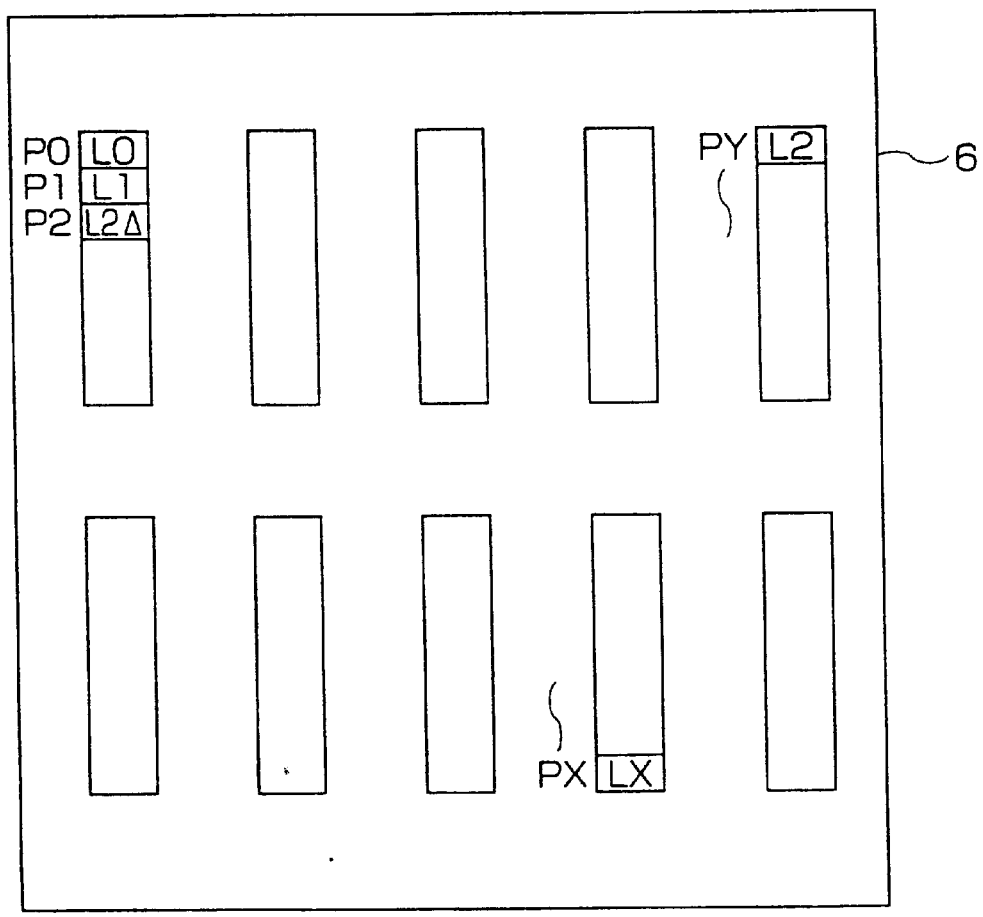
FIG. 13 is a drawing illustrating the configuration of a flash memory of the privately known but unpublished flash disk card.
Figure 14:
FIG. 14 is a drawing illustrating a change in content of the logical/physical sector address conversion table of the privately known but unpublished flash disk card.

In the first embodiment, sector ID and sector data of each of the sectors are stored together, as shown in FIG. 3. However, in the second embodiment, a sector ID area and a sector data area may be separated from each other in a block, as shown in FIG. 9.

Third Embodiment

In the first embodiment, the number of times the block has been erased is written as a parameter indicating an erasing characteristic in the block ID. However, in the third embodiment, the time required for block erasing or the number of erasing pulses corresponding to the time is used as a parameter indicating an erasing characteristic. Thus, the degrees of deterioration of respective blocks can be made uniform.

What is claimed is:

1. A flash disk card comprising:
   a main electrically rewritable nonvolatile flash memory for storing data in memory blocks of uniform memory capacity, each memory block having a physical address related to location of the block in said main memory and a logical address related to contents of the memory block, individual memory blocks being erased as an erase block unit; and
   access means for converting a logical block address of a memory block, equal in memory capacity to an erase block, into a physical block address of a memory block, equal in memory capacity to an erase block, and for accessing the flash memory based on the physical block address, wherein said access means converts a cylinder number, a head number, and a sector number, input to said access means from outside said flash disk card, into a logical block address of a memory block and a sector address in that memory block, converts the logical block address into a physical block address, and accesses said flash memory based on the physical block address and the sector address.

2. The flash disk card according to claim 1 wherein said access means includes a logical/physical block address conversion table for converting logical block addresses into physical block addresses by referring to the logical/physical block address conversion table.

3. The flash disk card according to claim 2 wherein said access means includes a flash disk control circuit for converting the cylinder number, the head number, and the sector number into a logical sector address and a microprocessor for converting the logical sector address into the logical block address and the sector address.

4. The flash disk card according to claim 3 wherein if the logical sector address is LSA, the cylinder number is C, each cylinder has HpC heads, the head number is H, each head has SpH sectors, and the sector number is S, then $$LSA=(C \times HpC+H) \times SpH+S-1.$$

5. The flash disk card according to claim 3 wherein if the logical block address is LBA, the logical sector address is LSA, and each block has SpB sectors, $$LBA=LSA/Spb$$

and any remainder corresponds to a sector address Sa within a memory block.

6. The flash disk card according to claim 2 wherein the logical/physical block address conversion table stores logical block addresses and physical block addresses in one-to-one correspondence.

7. The flash disk card according to claim 6 wherein the logical/physical block address conversion table is stored in a second electrically rewritable nonvolatile flash memory.

8. The flash disk card according to claim 7 wherein said second electrically rewritable nonvolatile flash memory comprises a portion of said main electrically rewritable nonvolatile flash memory.

9. The flash disk card according to claim 7 wherein said second electrically rewritable nonvolatile flash memory is separate from said main electrically rewritable nonvolatile flash memory.

10. The flash disk card according to claim 7 wherein each memory block has a block ID area for storing the logical block address of the memory block and at least one sector.

11. The flash disk card according to claim 10 wherein each sector has a sector ID area for storing an invalid sector flag, a sector use flag, and the sector address, and a sector data area for storing data.

12. The flash disk card according to claim 11 wherein each sector ID area is contiguous to a sector data area in a memory block.

13. The flash disk card according to claim 11 wherein all sector ID areas in a memory block are arranged together, sequentially, in a memory block.

14. The flash disk card according to claim 11 wherein all sector data areas in a memory block are arranged together, sequentially, in a memory block.

15. The flash disk card according to claim 10 wherein the block ID area further stores an erasing characteristic.

16. The flash disk card according to claim 15 wherein the erasing characteristic is erasure cycles of the memory block.

17. The flash disk card according to claim 15 wherein the erasing characteristic is erasure time of the memory block.

18. The flash disk card according to claim 15 wherein the erasing characteristic is pulses required for erasure of the memory block.

19. A flash disk card for use with conventional memory access signals designating a memory address of a hard disk memory in terms of a cylinder number, a head number, and a sector number of the hard disk memory, each sector having a fixed memory capacity, said flash disk card comprising:

a main electrically rewritable nonvolatile flash memory for storing data in memory blocks of uniform memory capacity, each memory block having a physical address related to a location of the block in said main memory and a logical address related to contents of the memory block, individual memory blocks being erased as an erase block unit, each memory block including a block ID area for storing a logical block address of the memory block and a plurality of sectors, each sector having the same memory capacity as a sector of the hard disk; and access means for converting a logical block address of a memory block, equal in memory capacity to an erase block, into a physical block address of a memory block, equal in memory capacity to an erase block, and for accessing the flash memory based on the physical block address, wherein said access means converts a cylinder number, a head number, and a sector number, input to said access means from outside said flash disk card, into a logical block address of a memory block and a sector address in that memory block, converts the logical block address into a physical block address, and accesses said flash memory based on the physical block address and the sector address.

* * * * *